United States Patent
Smith et al.

(10) Patent No.: US 6,172,120 B1
(45) Date of Patent: *Jan. 9, 2001

(54) PROCESS FOR PRODUCING LOW DENSITY GEL COMPOSITIONS

(75) Inventors: Douglas M. Smith, Albuquerque, NM (US); William C. Ackerman, Champaign, IL (US); Stephen Wallace; Elsbeth R. Lokey, both of Albuquerque, NM (US)

(73) Assignee: Cabot Corporation, Boston, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/826,982

(22) Filed: Apr. 9, 1997

(51) Int. Cl.$^7$ ...................................................... B01J 13/00
(52) U.S. Cl. ........................................... 516/100; 516/111
(58) Field of Search ...................................... 556/442, 457, 556/459; 423/338; 252/315.6, 315.2; 516/100, 111

(56) References Cited

U.S. PATENT DOCUMENTS

| | | |
|---|---|---|
| 2,269,059 | 1/1942 | McLachlan et al. . |
| 2,739,075 | 3/1956 | Iler . |
| 2,765,242 * | 10/1956 | Alexander et al. ................. 423/338 |
| 2,832,794 | 4/1958 | Gordon . |
| 2,901,460 | 8/1959 | Boldebuck . |
| 3,652,214 | 3/1972 | Aboutboul et al. . |
| 3,672,833 | 6/1972 | Teichner et al. . |
| 3,956,179 | 5/1976 | Sebestian et al. . |
| 4,150,101 | 4/1979 | Schmidt et al. . |
| 4,561,872 | 12/1985 | Luong et al. . |
| 4,667,417 | 5/1987 | Graser et al. . |
| 4,775,520 | 10/1988 | Unger et al. . |
| 4,810,415 | 3/1989 | Winkelbauer et al. . |
| 4,842,837 | 6/1989 | Takaaki et al. . |
| 4,911,903 | 3/1990 | Unger et al. . |
| 4,983,369 | 1/1991 | Barder et al. . |
| 5,017,540 | 5/1991 | Sandoval et al. . |
| 5,106,604 | 4/1992 | Agaskar . |
| 5,158,758 | 10/1992 | Chieng et al. . |
| 5,206,189 | 4/1993 | Caldwell . |
| 5,275,796 | 1/1994 | Tillotson et al. . |
| 5,326,738 | 7/1994 | Sandoval et al. . |
| 5,376,449 | 12/1994 | Harris et al. . |
| 5,391,364 | 2/1995 | Cogliati . |
| 5,395,805 | 3/1995 | Droege et al. . |
| 5,409,683 | 4/1995 | Tillotson et al. . |
| 5,420,168 | 5/1995 | Mayer et al. . |
| 5,647,962 * | 7/1997 | Jansen et al. ........................ 423/338 |
| 5,746,992 | 5/1998 | Yoldas et al. . |
| 5,928,723 * | 7/1999 | Koehlert et al. ..................... 427/213 |

FOREIGN PATENT DOCUMENTS

| | | |
|---|---|---|
| 0 372 251 | 6/1990 | (EP) . |
| 585456 * | 3/1994 | (EP) . |
| 0 684 642 * | 11/1995 | (EP) . |
| 854 659 | 4/1940 | (FR) . |
| 2 585 973 | 2/1987 | (FR) . |
| 93/23333 | 11/1993 | (WO) . |
| 94/25149 | 11/1994 | (WO) . |
| 96/06051 | 2/1996 | (WO) . |
| 96/12683 | 5/1996 | (WO) . |
| 96/18456 | 6/1996 | (WO) . |
| 97/01508 | 1/1997 | (WO) . |
| 97/22652 | 6/1997 | (WO) . |

OTHER PUBLICATIONS

Database WPI, Derwent Publications Ltd., London, GB, AN 86–098541, JP 61 044 711.

Database WPI, Derwent Publications Ltd., London, GB, AN 87–104939, JP 62 052 119.

Database WPI, Derwent Publications Ltd., London, GB, AN 87–247982, JP 62 171 914.

Patent Abstracts of Japan, vol. 10, No. 235 (C–366), JP 61 068 314 (1986).

Egeberg et al., "Freeze Drying of Silica Gels Prepared from Siliciumethoxid", Revue De Physique Appliquee, pp. C4–23–C4–28 (Apr. 24, 1989).

Heley et al., "Fine Low Density Silica Powders Prepared by Supercritical Drying of Gels Derived form Silicon Tetra-chloride"" Journal of Non–Crystalline Solids, vol. 186, pp. 30–36 (1995).

Kasraian et al., "Thermal Analysis of the Tertiary Butyl Alcohol–Water System and Its Implications on Freeze–Drying", Pharmaceutical Research, vol. 12, No. 4, pp. 484–490 (1995).

Klvana et al., "A New Method of Preparation of Aerogel-–Like Materials Using a Freeze–Drying Process", Revue De Physique Appliquee, pp. C4–29–C4–32 (Apr. 1998).

Pajonk, "Drying Methods Preserving the Textural Properties of Gels", Revue De Physique Appliquee, pp.C4–13–C4–22 (Apr. 24, 1989).

Shioji, S. et al., "Surface Alkoxylation of Silicas by Mild Reactions with Alcohols" Bull. Chem. Soc. Jpn., 65(3), 728–734 (1992).

(List continued on next page.)

* cited by examiner

Primary Examiner—Steven P. Griffin
Assistant Examiner—Stuart L. Hendrickson

(57) ABSTRACT

Processes for producing gel compositions comprising: esterifying a portion of the surface of a gel composition sufficient to produce a gel composition having a rod density of less than or equal to 0.15 g/cc, and/or a tap density of less than or equal to 0.2 g/cc through contact with at least one esterification agent and at least one catalyst. The processes may be utilized to produce low density gel compositions without the need for a supercritical drying step or thermal treatment.

20 Claims, 3 Drawing Sheets

OTHER PUBLICATIONS

Ballard, C.C. et al., "Esterification of the Surface of Amorphous Silica", *Industrial and Biochemicals Department, E.I. du Pont de Nemours & Co, Inc., Wilmington, Delaware*, 65, 20–25 (1961).

Heinrich et al., "Aerogels–Nanoporous Materials, Part I: Sol–Gel Process and Drying of Gels" *Journal of Porous Materials*, 1, 7–17 (1995).

Smith et al., "Preparation of Low–Density Xerogels at Ambient Pressure" *Journal of Non–Crystalline Solids* 186, 104–112 (1995).

PROCESS FOR PRODUCING LOW DENSITY GEL COMPOSITIONS

FIELD OF THE INVENTION

The present invention relates to a process for producing low density gel compositions, including aerogels, xerogels and the like, without the need for a supercritical drying step or thermal treatment.

BACKGROUND

The term "gel" encompasses wet gels, including hydrogels and alcogels; and gels dried from the wet gels including aerogels and xerogels. The term "aerogel" was coined by S. S. Kistler in U.S. Pat. No. 2,188,007 and is generally utilized to refer to a gel which has been dried under supercritical temperature/pressure conditions. The term "xerogel" is generally utilized to refer to a gel which has been dried by evaporation of the solvent. Gel composition refers to a composition comprising a gel which may further include other components, for example an opacifying agent or coloring agent.

Gel compositions are utilized in a wide variety of applications, including thermal and acoustic insulation; catalyst supports and carriers; filters and molecular sieves; rheology control agents; reinforcing agents; thickeners and electronics; adsorbents; flatting agents; particulate additives; membranes; filters; radiation detectors; coatings; and dielectrics and other applications set forth herein and/or known to those of ordinary skill in the art. Gel compositions having lower rod densities, and/or higher surface areas, and/or higher structure are more advantageous for use in many applications. A gel composition's rod density is related to the gel composition's porosity wherein gel composition's with lower rod densities will generally have higher porosities.

Gel compositions are generally produced by combining a gel precursor and suitable solvent to form a sol and then initiating gelation in the sol to form a "wet" gel comprising the solid gel structure and the liquid solvent. The liquid solvent is then removed to form a dry gel composition.

Aerogels produced utilizing a supercritical drying step generally have lower rod densities than heretofore known gel compositions produced without the use of supercritical drying and have therefore become the gel of choice for many applications. However, the supercritical drying step necessary for the production of an aerogel may require the use of relatively expensive and/or complex processing equipment and conditions and therefore be disadvantageous.

In addition to approaches utilizing supercritical drying, at least several other approaches to producing gels have been proposed.

Alexander et al. U.S. Pat. No. 2,765,242 disclose a process for producing gels utilizing aging in water at high temperature followed by heat treatment in alcohols at temperatures significantly above the boiling point in order to esterify the surface. The gel granules may then be milled until a fine powder is obtained. Disadvantages of the approach disclosed in Alexander et al. include the cost of the high pressure esterification step.

WO 94/25149 discloses a process for the preparation of xerogels by chemical surface modification. The disclosed chemical surface modification agents have the formula $R_xMX_y$ where R is an organic group such as $CH_3$, $C_2H_5$ etc.; X is a halogen and M is Si or Al. Potential disadvantages of the approach disclosed in WO 94/25149 include the high cost of the reagents and potential problems relating to disposal of the by-products of the reaction.

U.S. Pat. No. 5,270,027 discloses a process for preparing silica xerogels using alkanolamines. The disclosed process produces xerogels having a total pore volume variable from 2 to 3 cc/g. The equivalent density of individual granules is 0.29 to 0.37 g/cc. Potential disadvantages of the approach disclosed in U.S. Pat. No. 5,270,027 include the complicated steps disclosed as part of the process, in particular the thermal treatment step, and that the process is not disclosed as producing aerogels with densities low enough for certain applications.

It would be advantageous to have a process for producing a low rod density gel composition which does not require a supercritical drying step or thermal treatment step and which utilizes economical reagents.

SUMMARY OF THE INVENTION

The present invention provides processes for producing gel compositions comprising esterifying a portion of the surface of the gel composition sufficient to produce a gel composition having a rod density of less than or equal to 0.27 g/cc, and/or a tap density of less than or equal to 0.2 g/cc, through contact with at least one esterification agent and at least one catalyst. Preferably at least 20% of the surface of the gel composition is esterified through contact with the esterification agent and the catalyst.

In a first aspect, the present invention provides a process comprising:

esterifying a portion of the surface of a gel composition sufficient to produce a gel composition having a rod density of less than or equal to 0.27 g/cc through contact with at least one esterification agent in the presence of at least one catalyst at a pressure of less than or equal to 300 psia.

In a second aspect, the present invention provides a process comprising:

esterifying a portion of the surface of a gel composition sufficient to produce a gel composition having a rod density of less than or equal to 0.27 g/cc through contact with at least one esterification agent in the presence of at least one catalyst at a temperature of less than or equal to the atmospheric boiling point of the esterification agent.

In a third aspect, the present invention provides a process comprising: esterifying a portion of the surface of a gel composition sufficient to produce a gel composition having a rod density of less than or equal to 0.27 g/cc through sequential contact with at least one esterification agent and at least one catalyst at a pressure of less than or equal to 300 psia.

In a fourth aspect, the present invention provides a process comprising:

esterifying a portion of the surface of a gel composition sufficient to produce a gel composition having a rod density of less than or equal to 0.27 g/cc through sequential contact with at least one esterification agent and at least one catalyst at a temperature of less than or equal to the atmospheric boiling point of the esterification agent.

In a fifth aspect, the present invention provides a process comprising:

esterifying a portion of the surface of a gel composition sufficient to produce a gel composition having a tap density of less than or equal to 0.2 g/cc through contact with at least one esterification agent in the presence of at least one catalyst at a pressure of less than or equal to 300 psia.

In a sixth aspect, the present invention provides a process comprising:

esterifying a portion of the surface of a gel composition sufficient to produce a gel composition having a tap density of less than or equal to 0.2 g/cc through contact with at least one esterification agent in the presence of at least one catalyst at a temperature of less than or equal to the atmospheric boiling point of the esterification agent.

In a seventh aspect, the present invention provides a process comprising: esterifying a portion of the surface of a gel composition sufficient to produce a gel composition having a tap density of less than or equal to 0.2 g/cc through sequential contact with at least one esterification agent and at least one catalyst at a pressure of less than or equal to 300 psia.

In an eighth aspect, the present invention provides a process comprising:

esterifying a portion of the surface of a gel composition sufficient to produce a gel composition having a tap density of less than or equal to 0.2 g/cc through sequential contact with at least one esterification agent and at least one catalyst at a temperature of less than or equal to the atmospheric boiling point of the esterification agent.

An advantage of aspects of the present invention is that the processes may be performed at ambient temperatures and/or ambient pressures.

The features and advantages of the processes of the present invention are described in more detail in the following sections.

DETAILED DESCRIPTION OF THE INVENTION

Figure 1:
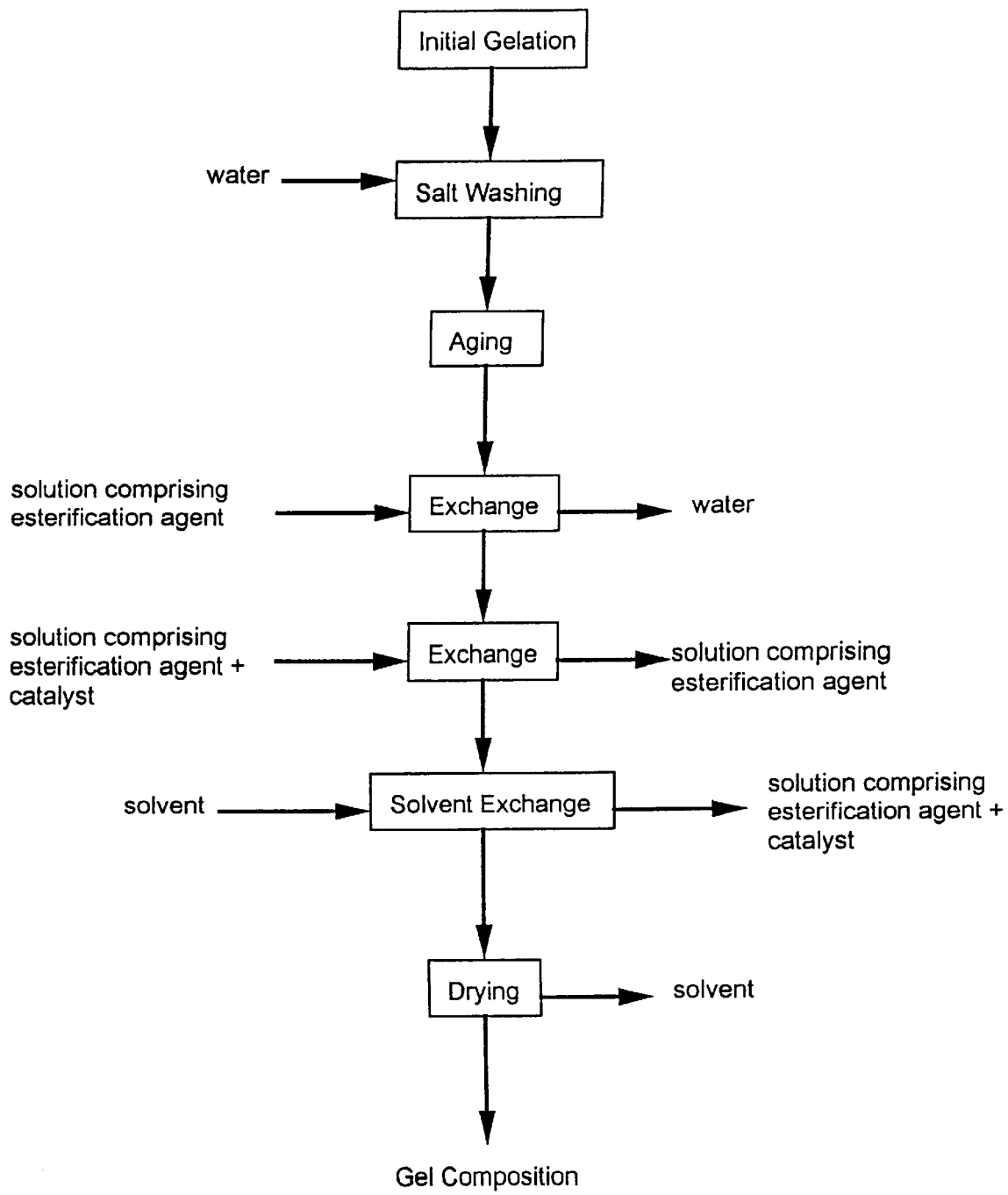
FIG. 1 is a schematic diagram of an embodiment of a process of the present invention for producing gel compositions.

The present invention provides processes for producing gel compositions which may be advantageously utilized to produce gel compositions having rod densities less than or equal to 0.27 g/cc without the need for drying at supercritical conditions.

According to the present invention, a process for producing a gel composition comprises: esterifying a portion of the surface of the gel composition sufficient to produce a gel composition having a rod density of less than or equal to 0.27 g/cc, preferably less than or equal to 0.22 g/cc, more preferably less than or equal to 0.15 g/cc, and/or a tap density of less than or equal to 0.2 g/cc, preferably less than or equal to 0.15 g/cc, more preferably less than or equal to 0.10 g/cc, through contact with at least one esterification agent and at least one catalyst. Preferably at least 20%, more preferably at least 35%, even more preferably 50% of the surface of the gel composition is esterified through contact with the esterification agent and the catalyst. Rod density, and the percentage of the surface of the gel which is esterified, may be determined in the manners set forth below.

As used herein, with reference to the surface of the gel composition, the term "esterified" means comprises an ester group (R—O—), where R is a chemical group found in the esterification agent.

An embodiment of a process of the present invention comprises:

esterifying a portion of the surface of a gel composition sufficient to produce a gel composition having a rod density of less than or equal to 0.27 g/cc, preferably less than or equal to 0.22 g/cc, more preferably less than or equal to 0.15 g/cc, through contact with at least one esterification agent in the presence of at least one catalyst at a pressure of less than or equal to 300 psia, preferably at a pressure of less than or equal to 100 psia, more preferably less than or equal to 30 psia, more preferably less than or equal to 16 psia. This embodiment of a process of the present invention is preferably performed at a temperature less than or equal to the atmospheric boiling point of the esterification agent, more preferably less than 100° C., more preferably less than 80° C.

As used herein, the term "atmospheric boiling point" refers to the boiling point at standard atmospheric conditions of 1 atmosphere (14.7 psia).

Another embodiment of a process of the present invention comprises:

esterifying a portion of the surface of a gel composition sufficient to produce a gel composition having a rod density of less than or equal to 0.27 g/cc, preferably less than or equal to 0.22 g/cc, more preferably less than or equal to 0.15 g/cc, through contact with at least one esterification agent in the presence of at least one catalyst at a temperature less than or equal to the atmospheric boiling point of the esterification agent, preferably less than 100° C., more preferably less than 80° C. This embodiment of a process of the present invention is preferably performed at a pressure of less than or equal to 300 psia, preferably at a pressure of less than or equal to 100 psia, more preferably less than or equal to 30 psia, more preferably less than or equal to 16 psia.

A further embodiment of a process of the present invention comprises:

esterifying a portion of the surface of a gel composition sufficient to produce a gel composition having a rod density of less than or equal to 0.27 g/cc, preferably less than or equal to 0.22 g/cc, more preferably 0.15 g/cc through sequential contact with at least one esterification agent and at least one catalyst at a pressure of less than or equal to 300 psia, preferably at a pressure of less than or equal to 100 psia, more preferably less than or equal to 30 psia, more preferably less than or equal to 16 psia. The sequential contact may comprise contacting the gel composition with the esterification agent and then the catalyst, or contacting the gel composition with the catalyst and then the esterification agent. This embodiment of a process of the present invention is preferably performed at a temperature less than or equal to the atmospheric boiling point of the esterification agent, more preferably less than 100° C., more preferably less than 80° C.

A further embodiment of a process of the present invention comprises:

esterifying a portion of the surface of a gel composition sufficient to produce a gel composition having a rod density of less than or equal to 0.27 g/cc, preferably less than or equal to 0.22 g/cc, more preferably 0.15 g/cc through sequential contact with at least one esterification agent and at least one catalyst at a temperature of less than or equal to the atmospheric boiling point of the esterification agent, preferably less than 100° C., more preferably less than 80° C. The sequential contact may comprise contacting the gel composition with the esterification agent and then the catalyst, or contacting the gel composition with the catalyst and then the esterification agent. This embodiment of a process of the present invention is preferably performed at a pressure of less than or equal to 300 psia, preferably at a pressure of less than or equal to 100 psia, more preferably less than or equal to 30 psia, more preferably less than or equal to 16 psia.

A further embodiment of a process of the present invention comprises:
  esterifying a portion of the surface of a gel composition sufficient to produce a gel composition having a tap density of less than or equal to 0.2 g/cc, preferably less than or equal to 0.15 g/cc, more preferably less than or equal to 0.10 g/cc, through contact with at least one esterification agent in the presence of at least one catalyst at a pressure of less than or equal to 300 psia, preferably at a pressure of less than or equal to 100 psia, more preferably less than or equal to 30 psia, more preferably less than or equal to 16 psia. This embodiment of a process of the present invention is preferably performed at a temperature less than or equal to the atmospheric boiling point of the esterification agent, more preferably less than 100° C., more preferably less than 80° C.

A further embodiment of a process of the present invention comprises:
  esterifying a portion of the surface of a gel composition sufficient to produce a gel composition having a tap density of less than or equal to 0.2 g/cc, preferably less than or equal to 0.15 g/cc, more preferably less than or equal to 0.10 g/cc, through contact with at least one esterification agent in the presence of at least one catalyst at a temperature of less than or equal to the atmospheric boiling point of the esterification agent, preferably less than 100° C., more preferably less than 80° C. This embodiment of a process of the present invention is preferably performed at a pressure of less than or equal to 300 psia, preferably at a pressure of less than or equal to 100 psia, more preferably less than or equal to 30 psia, more preferably less than or equal to 16 psia.

A further embodiment of a process of the present invention comprises: esterifying a portion of the surface of a gel composition sufficient to produce a gel composition having a tap density of less than or equal to 0.2 g/cc, preferably less than or equal to 0.15 g/cc, more preferably less than or equal to 0.10 g/cc, through sequential contact with at least one esterification agent and at least one catalyst at a pressure of less than or equal to 300 psia, preferably at a pressure of less than or equal to 100 psia, more preferably less than or equal to 30 psia, more preferably less than or equal to 16 psia. The sequential contact may comprise contacting the gel composition with the esterification agent and then the catalyst, or contacting the gel composition with the catalyst and then the esterification agent. This embodiment of the present invention is preferably performed at a temperature less than or equal to the atmospheric boiling point of the esterification agent, more preferably less than 100° C., more preferably less than 80° C.

A further embodiment of a process of the present invention comprises:
  esterifying a portion of the surface of a gel composition sufficient to produce a gel composition having a tap density of less than or equal to 0.2 g/cc, preferably less than or equal to 0.15 g/cc, more preferably less than or equal to 0.10 g/cc, through sequential contact with at least one esterification agent and at least one catalyst at a temperature of less than or equal to the atmospheric boiling point of the esterification agent, preferably less than 100° C., more preferably less than 80° C. The sequential contact may comprise contacting the gel composition with the esterification agent and then the catalyst, or contacting the gel composition with the catalyst and then the esterification agent. This embodiment of a process of the present invention is preferably performed at a pressure of less than or equal to 300 psia, preferably at a pressure of less than or equal to 100 psia, more preferably less than or equal to 30 psia, more preferably less than or equal to 16 psia.

The processes of the present invention may be carried out utilizing conventional laboratory and industrial scale mixing vessels and equipment for handling gels and gel compositions. The choice of the particular equipment utilized to practice the processes of the present invention is believed to be within the skill of one of ordinary skill in the art and therefore is not described in detail below.

As will be recognized by one of ordinary skill in the art from the description and examples set forth herein, the processes of the present invention may be performed as continuous or batch processes.

In the processes of the present invention, the esterification reaction is believed to esterify hydroxyl (—OH) groups on the surface of the gel composition. For example, in the case of a silica gel composition, the esterification reaction is believed to esterify silanol (—Si—OH) groups on the surface of the silica gel composition. If desired, the gel composition may be pre-treated to produce (—OH) surface groups for esterification. Suitable pre-treating agents include aqueous bases (hydroxyl ion donors) such as ammonium hydroxide.

Catalysts suitable for use in the processes of the present invention include any catalyst which catalyzes the esterification reaction to an extent sufficient to allow at least one esterification agent to esterify at a portion of the gel composition sufficient to produce a gel composition having a rod density of less than or equal to 0.27 g/cc, preferably less than or equal to 0.22 g/cc, more preferably 0.15 g/cc.

Suitable catalysts include bases (hydroxyl ion donors). Preferred catalysts have simple stereochemistry and may or may not react directly with the silica surface groups. It is also generally preferred for the catalyst to be soluble in water. Preferred catalysts also have a boiling point of different from the atmospheric boiling point of the esterification agent to facilitate separation and recovery of the catalyst from the esterification agent. In a process wherein the catalyst and the esterification agent are different compositions, it is preferable for the catalyst to be able to be separated from the esterification agent. In an embodiment of a process of the present invention wherein the catalyst is introduced as a liquid, it is preferred that the catalyst have a boiling point greater than the temperature at which the esterification is conducted.

Among the catalysts suitable for use in the processes of the present invention are included Lewis Bases such as ammonia ($NH_3$), amines and alcoholamines. Amines have the general formula, $R_{3-x}NH_x$ where R comprises an alkyl and/or aryl group. Alkyl amines include, methylamine, dimethylamine, trimethylamine, ethyl amine, iosporpylamine, n-butylamine, sec-butylamine, tert-butylamine, n,n dimethylbutylamine, 2-methoxylethylamine, cyclohexylamine, triethylenediamine, ethylenediamine, tetramethylenediamine, hexamethylenediamine, and tetramethylammonium hydroxide. Aromotic amines include aniline, methylaniniline, and diphenylamine. Alcoholamines are similar to the amines except that one or more of the alkyl or aryl R groups contain a hydroxyl group such as monoethanolamine ($H_2NC_2H_4OH$). Other examples of alcoholamines include: diethanolamine, triethanolamine, monopropanolamine, dipropranolamine, monoisopropanolamine, diisopropanolamine, mono-sec-butanolamine, di-sec-butanolamine, 2 amino-2-methyl-1-propanol, N-methylethanolamine, N-butylethanolamine, diperidine, and DMBA (dimethylbutylamine).

Esterification agents suitable for use in the processes of the present invention include chemical compositions which will react with the surface of the gel composition to esterify a portion of the gel composition sufficient to produce a gel composition having a rod density of less than or equal to 0.27 g/cc, preferably less than or equal to 0.22 g/cc, more preferably less than or equal to 0.15 g/cc and/or a tap density of less than or equal to 0.2 g/cc, preferably less than or equal to 0.22 g/cc, more preferably less than or equal to 0.10 g/cc. Generally the esterification agent will comprise a carbon atom and a hydroxyl group bonded to the carbon atom. The hydroxyl group will react with surface groups on the gel composition to modify the surface of the gel to minimize reactions among the surface groups which would increase the density of the gel. In the case of a silica gel, it is believed that the hydroxyl group reacts with silanol groups on the silica surface as follows:

SiOH+ROH<−>SiOR+$H_2O$.

As shown in the example esterification reaction above, after esterification a chemical group (R) from the esterification agent remains on the surface of the gel. Accordingly, where desired for a particular end use, a process of the present invention may be utilized to add chemical functionality to the surface of the resulting gel composition. For example, an esterification agent comprising allyl alcohol (discussed below) may be utilized to add vinyl functionality to the surface of the gel composition.

Suitable esterification agents include alcohols of the general formula ROH where R comprises an alkyl group or substituted alkyl group, including an alkylamine. The alcohol may comprise a primary alcohol, a secondary alcohol, a tertiary alcohol, and may further comprise halogen atoms, double bonds and/or an aromatic ring.

Suitable alcohols include methanol, ethanol, n-propanol, isopropanol, n-butanol, sec-butanol, isobutanol, tertbutanol, n-hexanol, n-octanol, n-decanol, n-octadecyl alcohol, cyclohexanol, benyzyl alcohol, allyl alcohol and trifluoroethanol. Suitable alcohols also include alcohols comprising multiple hydroxyl groups (diols or polyols) for example, ethylene glycol, 1,2 propylene glycol, 1,3 propylene glycol, 1,4 butane diol, glycerol and diols with sulfur substitution such as $HOC_2H_4S·SC_2H_4OH$ and $HOC_2H_4S·S·S·SC_2H_4OH$. Suitable esterification agents further include phenols, i.e. esterification agents wherein a hydroxyl group or groups is/are bound to a carbon atom or carbon atoms in an aromatic ring, for example phenol, o-cresol, m-cresol, p-cresol, catechol, resorcinol and hydroquinone.

Preferred alcohols include unbranched primary $C_1$–$C_4$ hydrocarbons, including methanol, ethanol, butanol and propanol.

Preferably the esterification agent is soluble in water and has a boiling points above the temperature at which the esterification is conducted.

One method for reacting the esterification agent with a gel composition in the presence of the catalyst is by forming a solution comprising the esterification agent and the catalyst and placing the solution in contact with the surface of the gel composition. Preferably, the catalyst is present in an amount of 0.5 to 95%, by weight in a solution comprising the catalyst and the esterification agent. More preferably, the catalyst is present in an amount of 0.5 to 5%, by weight, and even more preferably, the catalyst is present in an amount of 0.5 to 2%, by weight in a solution comprising the catalyst and the esterification agent. The esterification agent and the catalyst are allowed to remain in contact with the gel composition, under the temperature and/or pressure conditions specified, for a period of time sufficient to esterify a portion of the gel composition sufficient to produce a gel composition having a rod density of less than or equal to 0.27 g/cc.

The processes of the present invention may be utilized to produce gel compositions comprising: silica; titanium; aluminum; zirconium; other metal oxides and/or organo-metal oxides, or mixtures thereof. The gel compositions may further comprise filler materials including, but not limited to: carbonaceous materials; iron oxides; $Al_2O_3$; $FeTiO_3$; $TiO_2$; $ZrO_2$; and/or other filler materials known in the art. Carbonaceous materials include: carbon black; activated carbon; graphite; composites comprising carbon black and metal oxide (e.g. silica); and blends including such carbonaceous filler materials. A preferred carbon black has a nitrogen surface area ($N_2SA$) of at least 10 $m^2$/g, preferably 15 to 500 $m^2$/g.

A schematic diagram of an embodiment of a process of the present invention for producing a gel composition comprising silica is set forth in FIG. 1. As shown in FIG. 1, the process steps of the embodiments of the present invention may be performed after the initial gelation of a solution comprising a gel precursor.

Gel precursors include, but are not limited to, oxide, polymeric and particulate gel components known in the art, such as:

| Metal Oxide Gel Component | Form(s) as Gel Precursor |
| --- | --- |
| $SiO_2$ | Alkoxide, Silicate Compositions, Colloidal, Pyrogenic, Silicon Halides |
| $TiO_2$ | Alkoxide, Colloidal, Pyrogenic, Titanate Compositions, Titanium Halides |
| $Al_2O_3$ | Alkoxides, Colloidal, Aluminate Compositions, Salts, Pyrogenic, Aluminum Halides |
| $ZrO_2$ | Alkoxides, Colloidal, Zirconate Compositions, Salts, Pyrogenic, Zirconium Halides |
| Metal Oxide Composites | Combinations of the above precursors |
| Organo-Metal Oxide | Organo-metal forms of the above precursor |

Metal oxide composites refer to composite materials comprising combinations of metal and/or organo-metal oxides. The term organo-metal oxide refers to a composition comprising a metal oxide and an organic material (i.e. a material comprising $CH_x$ functionality) which may additionally comprise other chemical groups.

The choice of a particular gel precursor is made based on the type of composition desired. A preferred gel component for certain applications is $SiO_2$ with sodium silicate being the preferred precursor or form.

The initial gel may be produced from a stock solution. The stock solution may comprise the gel precursor, and a solvent. The amounts of each component will vary depending on the density and structure desired in the final gel composition. Suitable solvents will depend on the particular gel precursor. For a sodium silicate precursor a preferred solvent is water. The stock solution may be prepared by mixing the gel precursor and the solvent.

In order to achieve advantageously low densities in the final gel composition, the initial gelation step may be performed from a solution with a solids percentage by weight sufficiently low to achieve the rod density desired in the final gel composition after performing a process of the present invention, and by processing the solution, utilizing sol-gel processing techniques, in a manner wherein a low solids concentration is maintained in the final gel composition. In particular, the initial gelation step may be performed by initiating gelation in a solution comprising the gel precursor, or the gel precursor and additional solids, e.g. an opacifying agent, at an initial solids concentration to achieve the desired solids concentration in the final gel composition.

As understood by those of ordinary skill in the art, the solids concentration of the solution, which may comprise for example gel precursor and opacifying agent solids, is sufficient to achieve the densities desired in the final composition. In a preferred method of producing compositions of the present invention the solids concentration of the solution is less than or equal to 15%, preferably less than or equal to 10%, more preferably less than or equal to 8%, to achieve desirably low rod densities in the final composition.

The solution comprising the gel component may be produced, and the initial gelation may be performed, by conventional processes for producing gel compositions, for example utilizing conventional sol-gel processing techniques. In particular, the solution comprising the gel precursor may be produced and the initial gelation may be performed by the processes disclosed in the Examples herein. Various solutions, including metal alkoxides, colloidal suspensions, and combinations thereof may be utilized with a variety of mechanisms of gelation to reach the initial gelation stage. By varying processing conditions, such as time, temperature, pH, and pore fluid, the microstructure of the composition may be altered.

The initiation of gelation may be performed in any manner known in the art, including: manipulation of the pH of the stock solution through the addition of an acid or a base; manipulating the temperature and pressure of the stock solution through environmental controls; and utilizing a gelation catalyst, for example an acid or a base.

As shown in FIG. 1, after gelation through pH manipulation and the use of an gelation catalyst, e.g. sulfuric acid ($H_2SO_4$), the gel may be washed to remove residual salts. For example, in the case of a sodium silicate gel precursor and an $H_2SO_4$ catalyst, after gelation the gel may be washed with water to remove sodium sulfate ($Na_2SO_4$). The washing steps may be repeated until the desired amount of salts have been removed, for example to a point wherein the sodium concentration in the liquid phase is less than 100 parts per million.

After washing the resulting gel may be allowed to age in water to achieve the mechanical characteristics desired in the final gel composition.

As shown schematically in FIG. 1, after washing and/or aging, the solution remaining in the gel may be exchanged with a solution comprising at least one esterification agent. The exchange step may be repeated several times if desired. Preferably, after the exchange step(s) has/have been completed, the starting solution in the gel (e.g. water) has been substantially completely replaced with the solution comprising the esterification agent.

After the esterification agent exchange step(s) has/have been completed, the esterification agent solution in the gel is exchanged with a solution comprising at least one esterification agent and at least one catalyst. This exchange step may also be repeated several times if necessary.

After the esterification agent and catalyst solution exchange steps have been completed, the gel is allowed to age in contact with the esterification agent and the catalyst for a period of time, and under temperature and pressure conditions sufficient, to esterify at least a portion of the surface of the gel sufficient to produce a gel composition having a rod density of less than or equal to 0.27 g/cc. As specified above, in certain embodiments of the process of the present invention, the temperature is maintained below the atmospheric boiling point of the esterification agent and/or the pressure is maintained at, or below, 30 psia.

After the gel has aged in contact with the esterification agent and the catalyst, the solution comprising the esterification agent and the catalyst may be exchanged with with a solvent prior to drying. The list of suitable intermediate and drying solvents includes but is not limited to methanol, ethanol, n-propanol, iso-propanol, pentane, n-hexane, n-heptane. The exchange steps may be repeated several times.

After the solvent exchange, the resulting gel composition may be dried to remove the solvent. The drying step is performed in a manner sufficient to maintain/achieve a rod density in the dried gel composition of less than or equal to 0.27 g/cc, preferably less than or equal to 0.22 g/cc, more preferably less than or equal to 0.15 g/cc and/or a tap density of less than or equal to 0.2 g/cc, preferably less than or equal to 0.15 g/cc, more preferably less than or equal to 0.10 g/cc.

After drying, the gel composition may be further processed in manners known to the art. For example, the gel composition may be milled or ground to produce a powder comprising the gel composition The gel compositions may be dried by means known in the art for drying gels. One suitable method for performing the drying step while maintaining the desired rod density in the dried gel composition is to dry the gel composition in a vacuum chamber, at pressure of 0.1 to 14 psia. Another suitable method is to dry the gel at ambient pressures in a manner wherein the solvent is quickly removed from the gel, for example by drying the gel at an elevated temperature of 50 to 500° C.

Another suitable method, which may be advantageous in a large scale production process, is to dry the gel utilizing a fluidized bed. In general, fluidized bed drying may be accomplished by placing the wet gel composition in a fluidized bed reactor and passing a dry inert (with respect to the gel composition) gas through the gel composition. The fluidization velocity, the gas stream velocity necessary to maintain fluidization, will depend on the physical characteristics and volume of the wet gel but should be sufficient to maintain fluidization. The temperature of the gas may be approximately ambient temperature, e.g. 16–25° C.

In addition to the steps discussed above, and/or shown schematically in FIG. 1, additional washing, drying and/or aging steps may be included in a process of the present invention where desirable to produce a particular gel composition. In particular, a process of the present invention may include one or more of the following steps:

washing the wet gel prior to esterifying;
aging the wet gel prior to esterifying;

aging the gel during contact with the esterification agent in the presence of at least one catalyst; or exchanging (replacing) the fluid in the wet get after esterification with a different fluid (e.g. a solvent) prior to drying. In addition, particular aging steps may be performed at elevated temperature and/or pressure so long as the contact between the esterification agent and the wet gel occurs at the specified temperatures and/or pressures.

In general, the washing steps will comprise exchanging the solution within the gel for another solution and the drying steps will comprise drying the gel under temperature and pressure conditions sufficient to drive off a solution within the gel.

In general, the aging steps will comprise maintaining the gel, with or without solution present within the gel, and particular temperature and pressure conditions.

Depending on the characteristics desired in the final gel composition, optional steps such as thermal (or hydrothermal) aging prior to contacting the surface of the gel with at least one esterification agent and at least one catalyst may be included in the process of the present invention.

Figure 2:
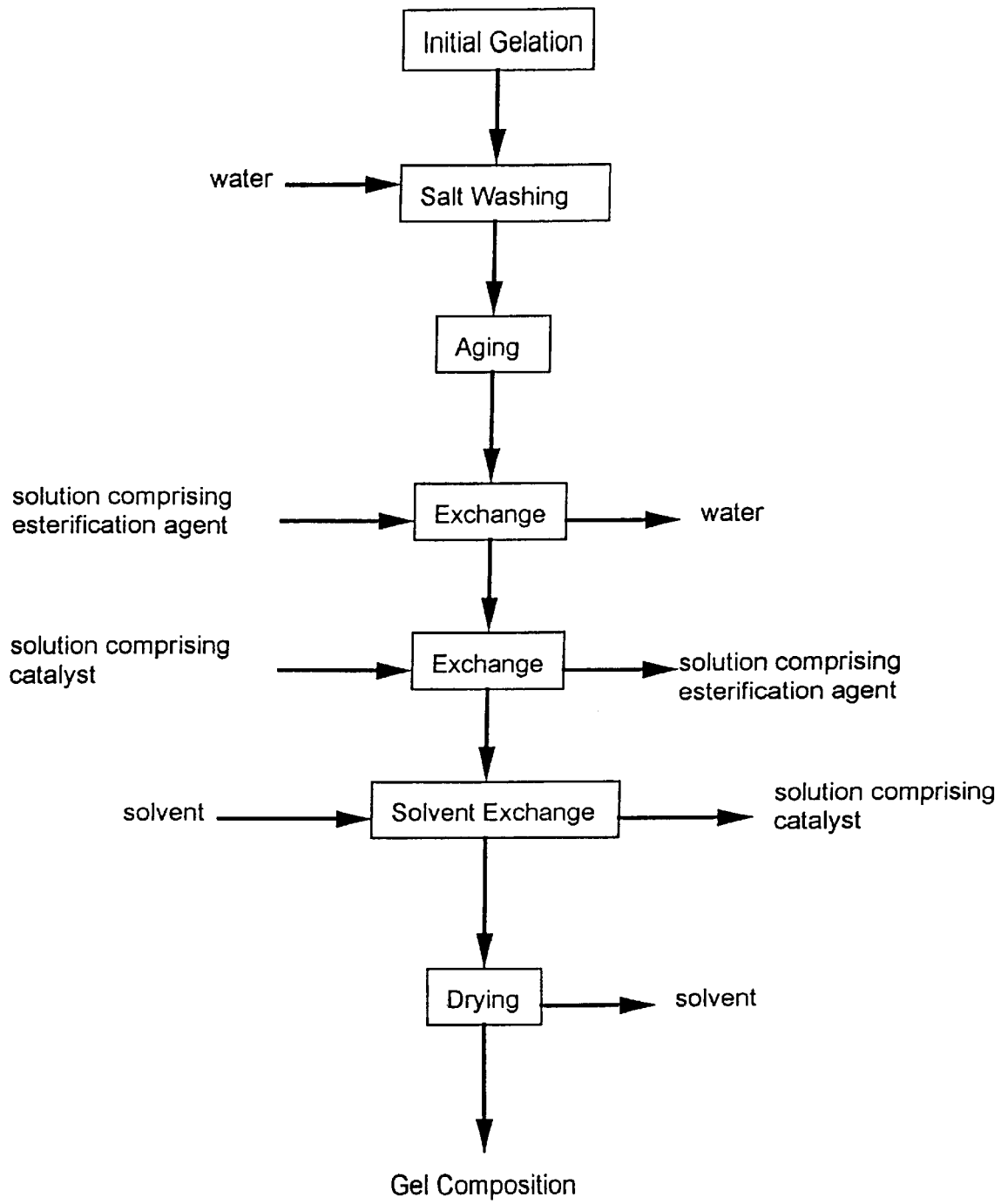
FIG. 2 is a schematic diagram of another embodiment of a process of the present invention for producing gel compositions.

An alternative embodiment of a process of the present invention is shown schematically in FIG. 2. As shown in FIG. 2, after washing and/or aging, the solution remaining in the gel may be exchanged with a solution comprising at least one esterification agent. The exchange step may be repeated several times if desired. Preferably, after the exchange step(s) has/have been completed, the starting solution in the gel (e.g. water) has been substantially completely replaced with the solution comprising the esterification agent.

After the esterification agent exchange step(s) has/have been completed, the esterification agent solution in the gel is exchanged with a solution comprising at least one catalyst. This exchange step may also be repeated several times if necessary. The solution comprising the catalyst may include up to 100%, by weight, the catalyst.

After the catalyst solution exchange steps have been completed, the gel is allowed to age in contact with the catalyst for a period of time, and under temperature and pressure conditions sufficient, to esterify at least a portion of the surface of the gel sufficient to produce a gel composition having a rod density of less than or equal to 0.27 g/cc. As specified above, in certain embodiments of the process of the present invention, the temperature is maintained below the atmospheric boiling point of the esterification agent and/or the pressure is maintained at, or below, 30 psia.

After the gel has aged, the solution comprising the catalyst may be exchanged with a solvent prior to drying. The list of suitable intermediate and drying solvents includes but is not limited to methanol, ethanol, n-propanol, isopropanol, pentane, n-hexane, n-heptane. The exchange steps may be repeated several times.

After the solvent exchange, the resulting gel composition may be dried to remove the solvent. The drying step is performed in a manner sufficient to maintain/achieve a rod density in the dried gel composition of less than or 0.27 g/cc, preferably less than or equal to 0.22 g/cc, more preferably less than or equal to 0.15 g/cc.

Additional steps, such as those set forth above, may be included in the process as desired.

Figure 3:
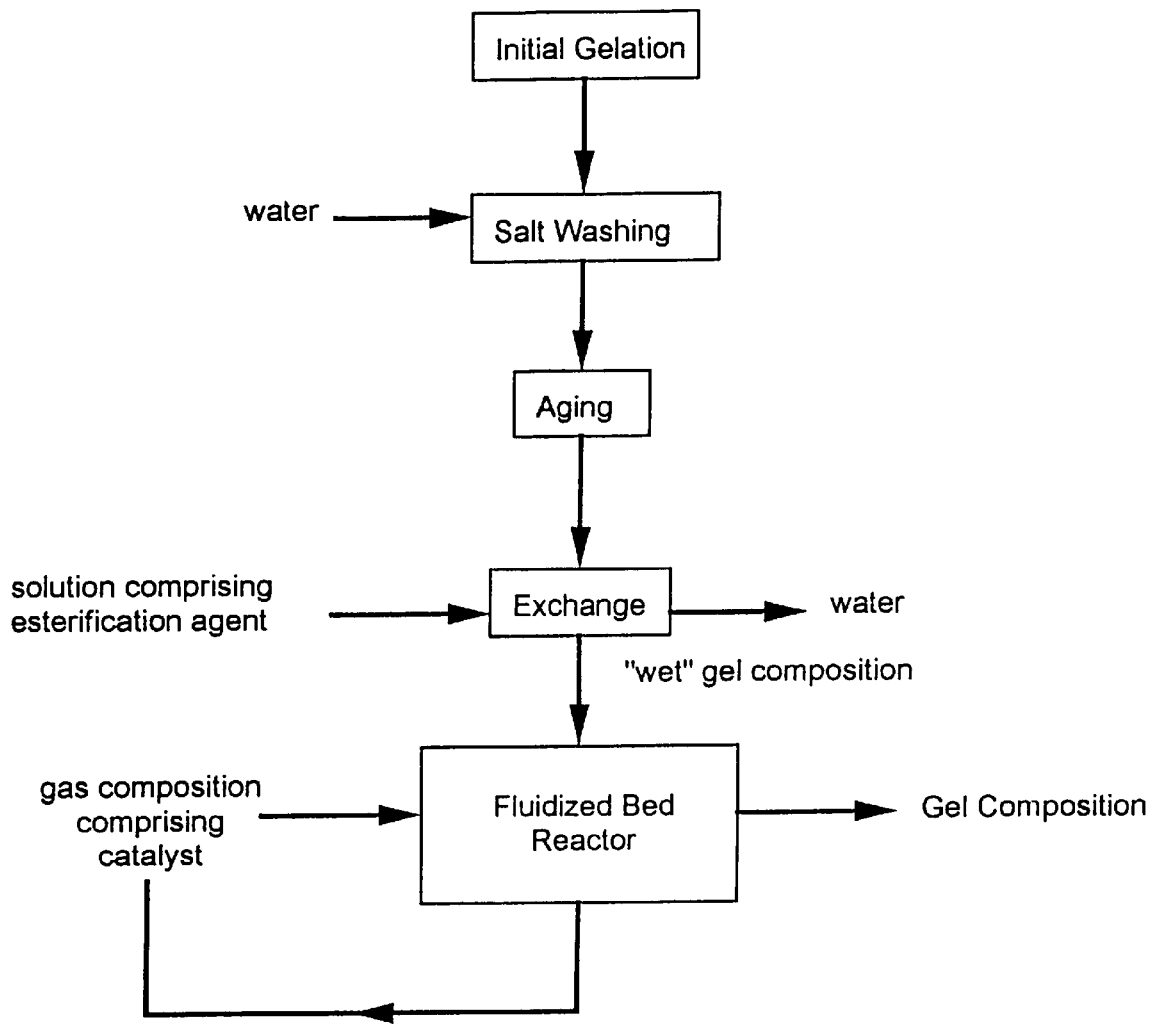
FIG. 3 is a schematic diagram of a further embodiment of a process of the present invention.

A further alternative embodiment of a process of the present invention is shown schematically in FIG. 3. As shown in FIG. 3, a "wet" gel comprising a gel composition and the esterification agent may be placed in a fluidized bed reactor and contacted with a gas composition comprising a carrier gas, preferably a dry inert (with respect to the gel composition) carrier gas, and the catalyst. The fluidization velocity will depend on the physical characteristics and volume of the wet gel but should be sufficient to maintain fluidization and enable the gas composition comprising the catalyst to flow through the gel to esterify a sufficient portion of the surface of the gel to produce a gel composition having a tap density of less than or equal to 0.22 g/cc. The temperature of the gas may be approximately ambient temperature, e.g. 16–25° C.

A further alternative embodiment of a process of the present invention comprises placing a "wet" gel comprising a gel composition and at least one catalyst in a fluidized bed reactor and contacting the wet gel with a gas composition comprising a carrier gas, preferably a dry inert (with respect to the gel composition) carrier gas, and at least one esterification agent. The fluidization velocity will depend on the physical characteristics and volume of the wet gel but should be sufficient to maintain fluidization and enable the gas composition comprising the esterification agent to flow through the gel to esterify a sufficient portion of the surface of the gel to produce a gel composition having a tap density of less than or equal to 0.22 g/cc. The temperature of the gas may be approximately ambient temperature, e.g. 16–25° C.

As will be recognized by those of ordinary skill in the art, and understood from the description included herein, successful implementation of the processes of the present invention may be accomplished through a variety of different process pathways.

The processes of the present invention may be advantageously utilized to produce gel compositions having a rod density less than or equal to approximately 0.27 grams/cubic centimeter (g/cc), preferably less than or equal to 0.22 g/cc, more preferably less than or equal to 0.15 g/cc. Preferred gel compositions produced by a process of the present invention have rod densities of 0.07 g/cc to 0.27 g/cc. Rod density may be determined by the procedure set forth below.

The processes of the present invention may also be advantageously utilized to produce gel compositions having a tap density less than or equal to approximately 0.2 grams/cubic centimeter (g/cc), preferably less than or equal to 0.15 g/cc, more preferably less than or equal to 0.10 g/cc. Preferred gel compositions produced by a process of the present invention have tap densities of 0.03 g/cc to 0.2 g/cc. Tap density may be determined by the procedure set forth below.

The processes of the present invention may be advantageously utilized to produce gel compositions with a wide range of surface areas, e.g. 40–1000 $m^2/g$, with the choice of particular surface area depending on the intended application for the gel composition. In particular, where desired, the process of the present invention may advantageously produce gel compositions having a BET surface areas of greater than or equal to 200 $m^2/g$, preferably greater than or equal to 400 $m^2/g$, more preferably greater than or equal to 500 $m^2/g$. BET surface area may be determined utilizing ASTM test procedure D1993.

The processes of the present invention may further be advantageously utilized to produce gel compositions having a porosity of greater than or equal to 0.86, preferably greater than or equal to 0.91, more preferably greater than or equal to 0.93. Porosity may be determined in the manner set forth below.

In addition, the processes of the present invention may be utilized to produce gel compositions having a pore volume greater than or equal to 3 cc/g, preferably greater than or equal to 4.5 cc/g, more preferably greater than or equal to 8 cc/g. Pore volume is the inverse of Rod density and may be determined in the manner set forth below.

Further, the processes of the present invention may be utilized to produce hydrophilic or hydrophobic gel compositions.

The gel compositions produced by the processes of the present invention may be utilized for applications including, but not limited to, thermal and acoustic insulation; catalyst supports and carriers; filters and molecular sieves; rheology control agents; reinforcing agents; thickeners and electronics; adsorbents; flatting agents; particulate additives; membranes; filters; radiation detectors; coatings; and dielectrics and other applications set forth herein and/or known to those of ordinary skill in the art.

The features and advantages of the processes of the present invention, and the gel compositions produced by the process of the present invention are further described in the following Examples.

The following analytical procedures may be utilized to determine properties of a gel composition and were utilized in the examples described below.

Porosity and Rod Density

The porosity of a gel compositions may be determined by determining the rod density of the composition and calculating the porosity by the following method.

To determine rod density (the density of a single piece of gel), the gels were cast and formed in cylindrical molds. The total gel volume was determined by physically measuring the dimensions of a dry gel. The rod density was determined by weighing the dry gel and dividing by the geometric volume. In instances where a rod like geometry was not maintained or, as a verification of the above method, mercury displacement was employed. As will be understood by those of ordinary skill in the art, a mercury displacement technique may not entirely fill all of the pores in the gel and therefore result is a slightly lower than actual density calculation.

The rod density of gel compositions measured by mercury displacement was carried out as follows. A clean empty glass cell is filled with mercury to a specific height and the cell is weighed. The mercury is then removed and the cell is cleaned again. Next, a dry gel sample of known weight is placed in the glass cell and mercury is added to the cell to the same specific height as before. The weight of the cell containing mercury and the sample is measured. The weight of mercury in both cases is then converted to a volume based on the density of mercury. The difference between the volume of mercury which fills an empty cell and the volume of mercury which fills the cell containing a sample is known as the displaced volume after subtracting the weight of the sample. Since mercury does not wet the sample this volume is equal to the total volume of the sample. The density is then determined by dividing the weight of the sample by the displaced volume.

Porosity is defined as the fraction of the sample volume that is pores, both in and around the particulate material and may be determined by the following formula:

$$\text{Porosity} = 1 - \frac{\text{(measured rod density in porous form)}}{\text{(density of the material in solid form)}}$$

(in the case of a silica gel $=> \epsilon = 1 - \rho_{rod}/\rho_{SiO2}$) The density of a solid mass of the material is determined with reference to the composition of the material. In the case of a silica gel composition, without opacifying agents, the density of the solid mass of material is assumed to be the density of a solid mass of silica which is 2.2 g/cc (220 kg/m3). In the case of a gel composition which includes opacifying agents, the density of the solid mass of material is assumed to be a weighted average of the densities of each component. For example, in the case of a gel composition comprising a silica gel precursor and a carbon black opacifying agent, the density of the solid mass of material is assumed to be a weighted average of the density of a solid mass of silica (2.2 g/cc) and the density of a solid mass of carbon black (1.8 g/cc).

Pore Volume

The pore volume of a gel sample may be calculated from the rod density as determined by the foregoing procedure utilizing the following relationship for a silica gel:

rod density=1/ (pore volume+1/$\rho_{SiO2}$)

Tap Density

The tap density of the gel samples was determined by the following procedure. 1.0 g of the material being analyzed was placed in an oven at 140° C. for 4–6 hours to remove physically bound water. The dried material was lightly ground to yield fine powder. About 0.1–1.0 g of the powder was then weighed out and poured into a 10 cc graduated measuring cylinder. The cylinder was lightly tapped 200 times all around in order to efficiently pack the material. The volume occupied by the material was noted. The tap density was obtained by dividing the weight of the material by the occupied volume.

Extent of Esterification

The percentage of the surface of a gel composition which is esterified may be determined by calculating the theoretical maximum number of ester groups per square nanometer (nm$^2$) which may be packed onto the surface of a gel composition and then dividing the number of ester groups found on the surface, as determined by the procedure set forth below, by the theoretical maximum number of ester groups per nm$^2$ as follows:

$$\% \text{ esterification} = \frac{\text{\# of ester groups per nm}^2}{\text{theoretical maximum \# of ester groups per nm}^2} \times 100\%$$

The theoretical maximum # of ester groups per square nanometer which may be added to the surface of a composition is limited by the smaller of two factors: the number of (—OH) groups per unit area or the maximum number of ester groups which may be packed on the surface. The maximum number of ester groups which may be packed due to steric hinderance is related to the size of the groups and how they arrange on the surface. Assuming that the ester groups are spherical, pack with the six nearest neighbors on the surface and that the packing efficiency is not affected by the (—OH) surface distribution, the theoretical maximum number of ester groups per square nanometer may be calculated from the following formula:

theoretical maximum # of ester groups per nm$^2$=$10^{-14}/\{1.091$ $[MW/(\rho_{liq} \times 6.023 \times 10^{23})]^{2/3}\}$ where MW=molecular weight of the esterification agent, and $\rho_{liq}$=liquid density of the esterification agent Using this formula the theoretical maximum # of ester groups per nm$^2$ are as indicated for the following possible esterification agents: methanol=5.5 #/nm$^2$; ethanol=4.3 #/nm$^2$; n-butanol=3.2 #/nm$^2$; n-hexanol=2.6 #/nm$^2$; t-butanol=3.2 #/nm$^2$; n-octanol=2.2 #/nm$^2$; allyl alcohol=3.9 #/nm$^2$; phenol=3.3 #/nm$^2$; ethylene glycol=4.5 #/nm$^2$; 1,2 propylene glycol=3.3 #/nm$^2$; trifluoroethanol=4.1 #/nm$^2$; monoethanol amine (MEA)=4.2 #/nm$^2$; 2-methoxyethylamine (2-MEA)=3.3 #/nm$^2$; dimethylbutylamine (DMBA)=2.4 #/nm$^2$; dimethylethanolamine (DMEA)=3.0 #/nm$^2$; diethanolamine (DEA)=3.1 #/nm$^2$; triethylenediamine (DABCO)=3.0 #/nm$^2$; and piperidine=3.1 #/nm$^2$.

Number of Surface Ester Groups

The number of surface ester groups per square nanometer on the surface of a surface modified metal oxide composition may be calculated from the surface area of the metal oxide composition and the TGA weight loss data which indicates the molecular weight of the surface ester species. The number of surface ester groups per square nanometer is calculated utilizing the following formula:

$$\#/nm^2 = [6.023 \times 10^{23} \times W]/[(100-W) \times MW \times SA \times 10^{18}]$$

where W=percent weight loss by thermogravimetric analysis

SA=surface area in m$^2$/g, and

MW=molecular weight of the ester group.

Carbon Black Analyticals

The nitrogen surface area (N$_2$SA) of the carbon blacks utilized in the examples, expressed as square meters per gram (m$^2$/g) was determined according to ASTM test procedure D3037 Method A.

The dibutyl phthalate adsorption value (DBP) of the carbon blacks utilized in the examples, expressed as milliliters per 100 grams of carbon black (ml/100 g), was determined according to the procedure set forth in ASTM D2414.

Carbon Black Properties

Carbon black CB-A utilized in the following examples is a carbon black produced by Cabot Corporation, Boston, Mass. which has a N$_2$SA of 24 m$^2$/g and a DBP of 132 ml/100 g.

A Modified CB-A carbon black is produced utilizing the following procedure.

Two hundred grams of CB-A is added to a solution of 10.1 g sulfanilic acid and 6.23 g of concentrated nitric acid in 21 g of water. A solution of 4.87 g of NaNO$_2$ in 10 g of water is added to the rapidly stirring mixture. 4-Sulfobenzenediazonium hydroxide inner salt is formed in situ, which reacts with the carbon black. After 15 minutes, the dispersion is dried in an oven at 125 C.

The resulting carbon black product is designated "Modified CB-A" and is a carbon black having attached 4C6H4SO3— groups.

BET Surface Area

BET surface area of a gel composition may be determined utilizing ASTM test procedure D1993.

Gravimetric Analysis

Gravimetric analysis of the gel compositions described in the Examples was performed in a Dupont Model 951 TGA (thermogravimetric analyzer), manufactured by E.I. duPont E. Nemours Company, Wilmington, Del. The analysis was performed on a 10–20 milligram sample at a rate of 10° C. per minute in an air flow of approximately 50 cc/min, from an ambient starting temperature (approx. 20° C.) to 600° C.

The thermal gravimetric analysis is intended to illustrate the presence of ester groups on the surface of the gel and thereby that an esterification reaction has taken place. In this regard, a gel composition without ester groups, or with a minimal number of ester groups, will show a small weight broad weight loss over the temperature range at which the thermal gravimetric analysis is performed due to decomposition of the surface hydroxyl groups (—OH). In contrast, a gel composition in which a significant portion of the surface comprises ester groups will show a sharp decomposition (in terms of weight loss) within a small temperature range, at the temperatures at which the thermal gravimetric analysis is performed.

Sodium Analysis

The analysis of the sodium content of the wet gels described in the examples below was performed utilizing a Model 710A sodium ion specific electrode, manufactured by Orion Research of Boston, Mass.

The following examples illustrate the features and advantages of the processes of the present invention in comparison to other processes. Examples of the processes of the present invention are set forth as "Examples", examples of other processes are set forth as "Comparative Examples".

COMPARATIVE EXAMPLE 1

This example illustrates the production of a gel composition, comprising 10% solids, by weight, according to a control sol-gel process at ambient pressure which in this case was 12.3 psia, which is ambient pressure for Albuquerque, N. Mex.

A silica stock solution was prepared by mixing a sodium silicate having an SiO$_2$/Na$_2$O molar ratio of 3.3:1, with deionized water in a volume ratio of water to sodium silicate such that the weight percent silica when neutralized with mineral acid was 10%. The sodium silicate was obtained from PQ Corporation, Valley Forge, Pa. and is available commercially.

A separate solution comprising 2M sulfuric acid (H$_2$SO$_4$) was prepared by diluting concentrated 98% H$_2$SO$_4$ from J. T. Baker, Phillipsburg, N.J. with water. An aliquot of the sodium silicate stock solution was then slowly added to an appropriate amount of stirred 2M acid such that the resulting silica sol would have a pH of between approximately 1.3 and 2.0. The rate of silicate addition was kept constant at 1 milliliter/minute and the acid solution was maintained at 15° C. in a jacketed beaker.

Gelation was accomplished by continued addition of the sodium silicate solution until the pH of the sol reached 5.0. At this point the sol was vigorously stirred for 2–5 minutes and then cast into cylindrical tubes. Gelation occurred in 5 to 15 minutes and the tubes were sealed to prevent premature drying. The gels were allowed to age for 1–2 hours at 50° C. in the molds after which they were removed and placed in sealed tubes containing deionized water and kept at room temperature.

Fresh water was added every 5 hours for a total of 20 hours at which time it was determined, through the use of a sodium electrode, that the amount of sodium sulfate salt present in the gel was less than 100 parts per million (ppm).

The gels were then aged at 80° C. in deionized water for 1 hour.

After aging the gels were placed in sealed tubes with 200 proof ethanol and allowed to exchange pore fluid for 6 hours at 50° C. The ethanol was obtained from Quantum Chemical, Cincinnati, Ohio.

The ethanol exchange was repeated until the residual water content of the gel reached less than approximately 0.2% by volume. When this point was reached, the ethanol was washed free from the gel with n-heptane through a series of exchanges over 6 hours at 50° C. The n-heptane was obtained from Interstate Chemical Company, Hermitage, Pa. After the ethanol was replaced with n-heptane, the gels were placed in a chamber and dried under a vacuum.

The resulting gel compositions had a rod density of 0.35 g/cc and a 2.1% broad weight loss at elevated temperatures due to decomposition of surface hydroxyl (—OH) groups, as seen in the thermal gravimetric analysis spectra, indicating substantially no esterification of the surface of the gel.

EXAMPLE 2

This example illustrates an embodiment of a process of the present invention which includes esterification of a wet gel, comprising 10% solids, by weight, using ethanol as at least one esterification agent and monoethanolamine (MEA) as a esterification agent/catalyst in a solution comprising 2% MEA, at ambient pressure which in this case was 12.3 psia.

A silica stock solution was prepared by mixing a sodium silicate having an $SiO_2/Na_2O$ molar ratio of 3.3:1, with deionized water in a volume ratio of water to sodium silicate such that the weight percent silica when neutralized with mineral acid was 10%. The sodium silicate was obtained from PQ Corporation, Valley Forge, Pa. and is available commercially.

A separate solution comprising 2M $H_2SO_4$ was prepared by diluting concentrated 98% $H_2SO_4$ from J. T. Baker, Phillipsburg, N.J. with water. An aliquot of the sodium silicate stock solution was then slowly added to an appropriate amount of stirred 2M acid such that the resulting silica sol would have a pH of between approximately 1.3 and 2.0. The rate of silicate addition was kept constant at 1 milliliter/minute and the acid solution was maintained at 15° C. in a jacketed beaker.

Gelation was accomplished by continued addition of the sodium silicate solution until the pH of the sol reached 5.0. At this point the sol was vigorously stirred for 2–5 minutes and then cast into cylindrical tubes. Gelation occurred in 5 to 15 minutes and the tubes were sealed to prevent premature drying. The gels were allowed to age for 1–2 hours at 50° C. in the molds after which they were removed and placed in sealed tubes containing deionized water and kept at room temperature.

Fresh water was added every 5 hours for a total of 20 hours at which time it was determined, through the use of a sodium electrode, that the amount of sodium sulfate salt present in the gel was less than 100 parts per million (ppm).

The gels were then aged at 80° C. in deionized water for 1 hour.

After aging the gels were placed in sealed tubes with 200 proof ethanol and allowed to exchange pore fluid for 6 hours at 50° C. The ethanol was obtained from Quantum Chemical, Cincinnati, Ohio.

The ethanol exchange was repeated until the residual water content of the gel reached less than approximately 0.2% by volume. At this point the gels were placed in a solution containing 2% by volume monoethanolamine in ethanol at 50° C. for approximately 12 hours. The ethanol utilized was obtained from Quantum Chemical. The monoethanolamine was obtained from Aldrich Chemical, Milwaukee, Wis.

After this step the gels were rinsed with fresh ethanol a few times. The ethanol was then washed free from the gel with n-heptane through a series of exchanges over 6 hours at 50° C. The n-heptane was obtained from Interstate Chemical Company, Hermitage, Pa. After the ethanol was replaced with n-heptane, the gels were placed in a chamber and dried under a vacuum. After vacuum drying the gels were placed in a convection oven at 130° C. to remove trace amounts of residual solvent.

The resulting gel compositions had a rod density of 0.17 g/cc and a sharp decomposition of approximately 11% by weight as seen in the thermal gravimetric analysis spectra indicating that a portion of the surface of the gel comprises ester groups.

EXAMPLE 3

This example illustrates an embodiment of a process of the present invention which includes esterification of a wet gel, comprising 9% solids, by weight, using ethanol as at least one esterification agent and monoethanolamine (MEA) as a esterification agent/catalyst in a solution comprising 2% MEA, at ambient pressure which in this case was 12.3 psia.

To prepare the gel, the steps from Example 2 were repeated utilizing a silica stock solution prepared by mixing a sodium silicate having an $SiO_2/Na_2O$ molar ratio of 3.3:1, with deionized water in a volume ratio of water to sodium silicate such that the weight percent silica when neutralized with mineral acid was 9%. The sodium silicate was obtained from PQ Corporation, Valley Forge, Pa. and is available commercially.

The resulting gel compositions had a rod density of 0.15 g/cc and a sharp decomposition of approximately 11% by weight as seen in the thermal gravimetric analysis spectra indicating that a portion of the surface of the gel comprises ester groups.

EXAMPLE 4

This example illustrates an embodiment of a process of the present invention which includes esterification of a wet gel, comprising 8% solids, by weight, using ethanol as at least one esterification agent and monoethanolamine (MEA) as a esterification agent/catalyst in a solution comprising 2% MEA, at ambient pressure which in this case was 12.3 psia.

To prepare the gel, the steps from Example 2 were repeated utilizing a silica stock solution prepared by mixing a sodium silicate having an $SiO_2/Na_2O$ molar ratio of 3.3:1, with deionized water in a volume ratio of water to sodium silicate such that the weight percent silica when neutralized with mineral acid was 8%. The sodium silicate was obtained from PQ Corporation, Valley Forge, Pa. and is available commercially.

The resulting gel compositions had a rod density of 0.12 g/cc and a sharp decomposition of approximately 11% by weight as seen in the thermal gravimetric analysis spectra indicating that a portion of the surface of the gel comprises ester groups.

EXAMPLE 5

This example illustrates an embodiment of a process of the present invention for producing a gel composition, comprising 8% solids, by weight, and further comprising carbon black, which includes esterification of a wet gel using ethanol as at least one esterification agent and monoethanolamine (MEA) as a esterification agent/catalyst in a solution comprising 2% MEA, at ambient pressure which in this case was 12.3 psia.

A silica stock solution was prepared by mixing a sodium silicate having an $SiO_2/Na_2O$ molar ratio of 3.3:1, with deionized water in a volume ratio of water to sodium silicate such that the weight percent silica when neutralized with mineral acid was 8%. The sodium silicate was obtained from PQ Corporation, Valley Forge, Pa. and is available commercially.

A separate solution comprising 2M $H_2SO_4$ was prepared by diluting concentrated 98% $H_2SO_4$ from J. T. Baker, Phillipsburg, N.J. with water. An aliquot of the sodium silicate stock solution was then slowly added to an appropriate amount of stirred 2M acid such that the resulting silica sol would have a pH of between approximately 1.3 and 2.0. The rate of silicate addition was kept constant at 1 milliliter/minute and the acid solution was maintained at 15° C. in a jacketed beaker.

After the sodium silicate solution was added such that the pH of the sol was between 1.3 and 2.0, carbon black was added to the sol such that the overall solids content (silica+carbon) was maintained at 8% and the carbon content as a percentage of the total solids was 15%. The carbon black utilized was identified as carbon black Modified CB-A and was specially treated in the manner described above to enable ease of dispersion.

Gelation was accomplished by continued addition of the sodium silicate solution until the pH of the sol reached 5.0. At this point the sol was vigorously stirred for 2–5 minutes and then cast into cylindrical tubes. Gelation occurred in 5 to 15 minutes and the tubes were sealed to prevent premature drying. The gels were allowed to age for 1–2 hours at 50° C. in the molds after which they were removed and placed in sealed tubes containing deionized water and kept at room temperature.

Fresh water was added every 5 hours for a total of 20 hours at which time it was determined, through the use of a sodium electrode, that the amount of sodium sulfate salt present in the gel was less than 100 parts per million (ppm).

The gels were then aged at 80° C. in deionized water for 1 hour.

After aging the gels were placed in sealed tubes with 200 proof ethanol and allowed to exchange pore fluid for 6 hours at 50° C. The ethanol was obtained from Quantum Chemical, Cincinnati, Ohio.

The ethanol exchange was repeated until the residual water content of the gel reached less than approximately 0.2% by volume.

At this point the gels were placed in a solution containing 2% by volume monoethanolamine in ethanol at 50° C. for approximately 12 hours. The ethanol utilized was obtained from Quantum Chemical. The monoethanolamine was obtained from Aldrich Chemical, Milwaukee, Wis.

After this step the gels were rinsed with fresh ethanol a few times. The ethanol was then washed free from the gel with n-heptane through a series of exchanges over 6 hours at 50° C. The n-heptane was obtained from Interstate Chemical Company, Hermitage, Pa. After the ethanol was replaced with n-heptane, the gels were placed in a chamber and dried under a vacuum. After vacuum drying the gels were placed in a convection oven at 130° C. to remove trace amounts of residual solvent.

The resulting gel compositions had a rod density of 0.11 g/cc and a sharp decomposition of approximately 8% by weight as seen in the thermal gravimetric analysis spectra indicating that a portion of the surface of the gel comprises ester groups.

EXAMPLE 6

This example illustrates an embodiment of a process of the present invention which includes esterification of a wet gel, comprising 7% solids, by weight, using ethanol as at least one esterification agent and monoethanolamine (MEA) as a esterification agent/catalyst in a solution comprising 2% MEA, at ambient pressure which in this case was 12.3 psia.

To prepare the gel, the steps from Example 2 were repeated utilizing a silica stock solution prepared by mixing a sodium silicate having an $SiO_2/Na_2O$ molar ratio of 3.3:1, with deionized water in a volume ratio of water to sodium silicate such that the weight percent silica when neutralized with mineral acid was 7%. The sodium silicate was obtained from PQ Corporation, Valley Forge, Pa. and is available commercially.

The resulting gel compositions had a rod density of 0.10 g/cc and a sharp decomposition of approximately 11% by weight as seen in the thermal gravimetric analysis spectra indicating that a portion of the surface of the gel comprises ester groups.

EXAMPLE 7

This example illustrates an embodiment of a process of the present invention which includes esterification of a wet gel, comprising 6% solids, by weight, using ethanol as at least one esterification agent and monoethanolamine (MEA) as a esterification agent/catalyst in a solution comprising 2% MEA, at ambient pressure which in this case was 12.3 psia.

To prepare the gel, the steps from Example 2 were repeated utilizing a silica stock solution prepared by mixing a sodium silicate having an $SiO_2/Na_2O$ molar ratio of 3.3:1, with deionized water in a volume ratio of water to sodium silicate such that the weight percent silica when neutralized with mineral acid was 6%. The sodium silicate was obtained from PQ Corporation, Valley Forge, Pa. and is available commercially.

The resulting gel compositions had a rod density of 0.12 g/cc and a sharp decomposition of approximately 8% by weight as seen in the thermal gravimetric analysis spectra indicating that a portion of the surface of the gel comprises ester groups.

EXAMPLE 8

This example illustrates an embodiment of a process of the present invention which includes esterification of a wet gel, comprising 5% solids, by weight, using ethanol as at least one esterification agent and monoethanolamine (MEA) as a esterification agent/catalyst in a solution comprising 2% MEA, at ambient pressure which in this case was 12.3 psia.

To prepare the gel, the steps from Example 2 were repeated utilizing a silica stock solution prepared by mixing a sodium silicate having an $SiO_2/Na_2O$ molar ratio of 3.3:1, with deionized water in a volume ratio of water to sodium silicate such that the weight percent silica when neutralized with mineral acid was 5%. The sodium silicate was obtained from PQ Corporation, Valley Forge, Pa. and is available commercially.

The resulting gel compositions had a rod density of 0.15 g/cc and a sharp decomposition of approximately 8% by weight as seen in the thermal gravimetric analysis spectra indicating that a portion of the surface of the gel comprises ester groups.

EXAMPLE 9

This example illustrates an embodiment of a process of the present invention which includes esterification of a wet gel, comprising 6% solids, by weight, using n-propanol as at least one esterification agent and monoethanolamine (MEA) as a esterification agent/catalyst in a solution comprising 2% MEA, at ambient pressure which in this case was 12.3 psia.

In this Example the process steps from Example 7 were followed with the following exceptions.

After the gels were aged at 80° C. in deionized water for 1 hour the gels were rinsed several times with deionized water and placed in sealed tubes with 200 proof n-propanol and allowed to exchange pore fluid for 6 hours at 50° C. The n-propanol was obtained from Interstate Chemical Company, Hermitage, Pa.

The n-propanol exchange and aging was repeated until the residual water content of the gel reached approximately 0.2% by volume.

At this point the gels were placed in a solution containing 2% by volume monoethanolamine in n-propanol at 50° C. for approximately 12 hours. The n-propanol utilized was obtained from Quantum Chemical. The monoethanolamine was obtained from Aldrich Chemical, Milwaukee, Wis.

After this step the gels were rinsed with fresh n-propanol a few times. The n-propanol was then washed free from the gel with n-heptane through a series of exchanges over 6 hours at 50° C. After the n-propanol has been replaced with n-heptane, the gels are placed in a chamber and dried under a vacuum. After vacuum drying the gels were placed in a convection oven at 130° C. to remove trace amounts of residual solvent.

The resulting gel compositions had a rod density of 0.15 g/cc and a sharp decomposition of approximately 11% by weight as seen in the thermal gravimetric analysis spectra indicating that a portion of the surface of the gel comprises ester groups.

EXAMPLE 10

This example illustrates an embodiment of a process of the present invention which includes esterification of a wet gel, comprising 6% solids, by weight, using n-propanol as at least one esterification agent and 2-methoxyethylamine (MEA) as a esterification agent/catalyst in a solution comprising 2% MEA, at ambient pressure which in this case was 12.3 psia.

In this Example the process steps from Example 9 were followed with the following exceptions.

After n-propanol exchange and aging was repeated until the residual water content of the gel reached approximately 0.2% by volume, the gels were placed in a solution containing 2% by volume 2-methoxyethylamine in n-propanol at 50° C. for approximately 12 hours. The n-propanol utilized was obtained from Quantum Chemical. The 2-methoxyethylamine was obtained from Aldrich Chemical, Milwaukee, Wis.

After this step the gels were rinsed with fresh n-propanol a few times. The n-propanol was then washed free from the gel with n-heptane through a series of exchanges over 6 hours at 50° C. After the n-propanol was replaced with n-heptane, the gels are placed in a chamber and dried under a vacuum. After vacuum drying the gels were placed in a convection oven at 130° C. to remove trace amounts of residual solvent.

The resulting gel compositions had a rod density of 0.15 g/cc and a sharp decomposition of approximately 11% by weight as seen in the thermal gravimetric analysis spectra indicating that a portion of the surface of the gel comprises ester groups.

COMPARATIVE EXAMPLE 11

This example was the same as example 1 except that the solids content was decreased and carbon black was added. After the sodium silicate solution was added so the pH of the sol was between 1.3 and 2.0, Modified CB-A carbon black, described above, was added to the sol so the overall solids content (silica+carbon) was maintained at 5% and the carbon content as a percentage of the total solids was 15%.

The resulting materials had a bulk density of 0.32 g/cc and a broad TGA weight loss of 2.1% at elevated temperatures due to decomposition of surface hydroxyl (—OH) groups, as seen in the thermal gravimetric analysis spectra, indicating substantially no esterification of the surface of the gel.

EXAMPLE 12

This example was the same as example 2 except that the solids content was decreased, carbon black was added, and the MEA concentration was decreased. After the sodium silicate solution was added so the pH of the sol was between 1.3 and 2.0, Modified CB-A carbon black, described above, was added to the sol so the overall solids content (silica+carbon) was maintained at 6% and the carbon content as a percentage of the total solids was 15%.

The MEA concentration used was 0.5% instead of 2%.

The resulting materials had a bulk density of 0.148 g/cc and a sharp decomposition of approximately 5.5% by weight as seen in the thermal gravimetric analysis spectra indicating that a portion of the surface of the gel comprises ester groups.

EXAMPLE 13

This example was the same as example 2 except that the solids content was decreased, and carbon black was added. After the sodium silicate solution was added so the pH of the sol was between 1.3 and 2.0, Modified CB-A carbon black, described above, was added to the sol so the overall solids content (silica+carbon) was maintained at 6% and the carbon content as a percentage of the total solids was 15%.

The resulting materials had a bulk density of 0.125 g/cc and a sharp decomposition of approximately 8.5% by weight as seen in the thermal gravimetric analysis spectra indicating that a portion of the surface of the gel comprises ester groups.

EXAMPLE 14

This example was the same as example 2 except that the solids content was decreased, carbon black was added, and the MEA concentration were increased. After the sodium silicate solution was added so the pH of the sol was between 1.3 and 2.0, Modified CB-A carbon black, described above, was added to the sol so the overall solids content (silica+carbon) was maintained at 8% and the carbon content as a percentage of the total solids was 15%. The MEA concentration was 100% instead of 2%, so the gel was placed in a pure MEA solution after the ethanol exchange. The monoethanolamine was obtained from Aldrich Chemical, Milwaukee, Wis.

The resulting materials had a bulk density of 0.113 g/cc and a sharp decomposition of approximately 8.5% by weight as seen in the thermal gravimetric analysis spectra indicating that a portion of the surface of the gel comprises ester groups.

EXAMPLE 15

This example was the same as example 2 except that the solids content and the catalyst concentration was decreased, carbon black was added and a different catalyst was used. After the sodium silicate solution was added so the pH of the sol was between 1.3 and 2.0, Modified CB-A carbon black, described above, was added to the sol so the overall solids content (silica+carbon) was maintained at 6% and the carbon content as a percentage of the total solids was 15%. 2-Methoxy ethylamine (2-MEA) was used instead of MEA, and the 2-MEA concentration was 1% instead of 2%. The 2-methoxyethanolamine was obtained from Aldrich Chemical, Milwaukee, Wis.

The resulting materials had a bulk density of 0.140 g/cc and a sharp decomposition of approximately 8.0% by weight as seen in the thermal gravimetric analysis spectra indicating that a portion of the surface of the gel comprises ester groups.

EXAMPLE 16

This example was the same as example 15 except instead of drying under a vacuum, the gel was dried at ambient pressure at 150° C.

The resulting materials had a bulk density of 0.164 g/cc and a sharp decomposition of approximately 8.4% by weight as seen in the thermal gravimetric analysis spectra indicating that a portion of the surface of the gel comprises ester groups.

EXAMPLE 17

This example was the same as example 15 except that the solids content was decreased to 5%, and no carbon black was added.

The resulting materials had a bulk density of 0.126 g/cc and a sharp decomposition of approximately 8.4% by weight as seen in the thermal gravimetric analysis spectra indicating that a portion of the surface of the gel comprises ester groups.

COMPARATIVE EXAMPLE 18

This example was the same as example 13 except that i-propanol (IPA) from Aldrich Chemical Co., Milwaukee, Wis., was used instead of ethanol in every instance. The resulting materials had a bulk density of 0.295 g/cc and a broad TGA weight loss of 2.0% at elevated temperatures due to decomposition of surface hydroxyl (—OH) groups, as seen in the thermal gravimetric analysis spectra, indicating substantially no esterification of the surface of the gel.

EXAMPLE 19

This example is the same as example 15 except that n-propanol (n-PrOH) from Aldrich Chemical Co., Milwaukee, Wis., was used instead of ethanol in every instance, and the solids content was decreased to 5%. The resulting materials had a bulk density of 0.156 g/cc and a sharp decomposition of approximately 12% by weight as seen in the thermal gravimetric analysis spectra indicating that a portion of the surface of the gel comprises ester groups.

EXAMPLE 20

This example is the same as example 19 except instead of drying under a vacuum, the gel was dried at ambient pressure at 150° C. The resulting materials had a bulk density of 0.165 g/cc and a sharp decomposition of approximately 12.7% by weight as seen in the thermal gravimetric analysis spectra indicating that a portion of the surface of the gel comprises ester groups.

EXAMPLE 21

This example is the same as example 19 except that no carbon black was added. The resulting materials had a bulk density of 0.125 g/cc and a sharp decomposition of approximately 10.5% by weight as seen in the thermal gravimetric analysis spectra indicating that a portion of the surface of the gel comprises ester groups.

EXAMPLE 22

This example is the same as example 19 except that the solids content was increased to 6%. The resulting materials had a bulk density of 0.161 g/cc and a sharp decomposition of approximately 10.1% by weight as seen in the thermal gravimetric analysis spectra indicating that a portion of the surface of the gel comprises ester groups.

EXAMPLE 23

This example is the same as example 13 except that n-butanol (n-BuOH) from Aldrich Chemical Co., Milwaukee, Wis., was used instead of ethanol in every instance. The resulting materials had a bulk density of 0.190 g/cc and a sharp decomposition of approximately 9.4% by weight as seen in the thermal gravimetric analysis spectra indicating that a portion of the surface of the gel comprises ester groups.

EXAMPLE 24

This example is the same as example 23 except that the solids content was reduced to 5% and n-hexanol (n-HeOH) was used instead of n-butanol in every instance. The resulting materials had a bulk density of 0.365 g/cc and a sharp decomposition of approximately 13.0% by weight as seen in the thermal gravimetric analysis spectra indicating that a portion of the surface of the gel comprises ester groups.

COMPARATIVE EXAMPLE 25

This example is the same as example 23 except that acetone from Aldrich Chemical Co., Milwaukee, Wis., was used instead of n-butanol in every instance, and the MEA concentration were increased to 100% from 2%, so the gel was placed in a pure MEA solution after the acetone exchange. The resulting materials had a bulk density of 0.340 g/cc and a broad TGA weight loss of 2.2% at elevated temperatures due to decomposition of surface hydroxyl (—OH) groups, as seen in the thermal gravimetric analysis spectra, indicating substantially no esterification of the surface of the gel.

A summary of the results from each Example 1–25 is set forth in the following Table 1.

TABLE 1

| Example | Comp. Example | Gel/ Wt. % | Ester. Agent | Catalyst/ Concentration (% by Vol.) | Rod Density g/cc | TGA Weight Loss |
|---|---|---|---|---|---|---|
| — | 1 | Silica 10% | None | None | 0.35 | None |
| 2 | — | Silica 10% | Ethanol | MEA/2% | 0.17 | 11% |
| 3 | — | Silica 9% | Ethanol | MEA/2% | 0.15 | 11% |
| 4 | — | Silica 8% | Ethanol | MEA/2% | 0.12 | 11% |
| 5 | — | (Silica + CB) 8% | Ethanol | MEA/2% | 0.11 | 8% |
| 6 | — | Silica 7% | Ethanol | MEA/2% | 0.10 | 11% |
| 7 | — | Silica 6% | Ethanol | MEA/2% | 0.12 | 8% |
| 8 | — | Silica 5% | Ethanol | MEA/2% | 0.15 | 8% |
| 9 | — | Silica 6% | n-propanol | MEA/2% | 0.15 | 11% |
| 10 | — | Silica 6% | n-propanol | 2-MEA/2% | 0.15 | 11% |
| — | 11 | (Silica + CB) 5% | ethanol | none | 0.32 | 2.1% |
| 12 | — | (Silica + CB) 6% | ethanol | MEA/0.5% | 0.15 | 5.5 |
| 13 | — | (Silica + CB) 6% | ethanol | MEA/2% | 0.12 | 8.5 |
| 14 | — | (Silica + CB) 8% | ethanol | MEA/100% | 0.11 | 8.5 |
| 15 | — | (Silica + CB) 6% | ethanol | 2-MEA/1% | 0.14 | 8.0 |
| 16* | — | (Silica + CB) 6% | ethanol | 2-MEA/1% | 0.16 | 8.4 |
| 17 | — | Silica 5% | ethanol | 2-MEA/1% | 0.13 | 8.4 |
| — | 18 | (Silica + CB) 6% | iso-propanol | MEA/2% | 0.29 | 2.0 |
| 19 | — | (Silica + CB) 5% | n-propanol | 2-MEA/1% | 0.16 | 12.2 |
| 20* | — | (Silica + CB) 5% | n-propanol | 2-MEA/1% | 0.16 | 12.7 |
| 21 | — | Silica 5% | n-propanol | 2-MEA/1% | 0.12 | 10.5 |
| 22 | — | (Silica + CB) 6% | n-propanol | 2-MEA/1% | 0.16 | 10.1 |
| 23 | — | (Silica + CB) 6% | n-butanol | MEA/2% | 0.19 | 9.4 |
| 24 | — | (Silica + CB) 5% | n-hexanol | MEA/2% | 0.36 | 13.0 |
| — | 25 | (Silica + CB) 6% | acetone | MEA/100% | 0.34 | 2.2 |

*=Oven Drying; Comp. Example = Comparitive Example; CB = 15%, by weight, Carbon Black The results set forth in the Examples, and summarized in Table 1 illustrate that the process of the present invention may be utilized, with different esterification agents and catalysts, to produce gel compositions having rod densities below 0.27 g/cc.

It should be clearly understood that the forms of the present invention herein described are illustrative only and are not intended to limit the scope of the invention.

What is claimed is:

1. A process for producing a gel composition comprising: esterifying a significant portion of the surface of a gel composition sufficient to produce a gel composition having a rod density of less than or equal to 0.15 g/cc through contact with at least one esterification agent in the presence of at least one catalyst at a pressure of less than or equal to 300 psia, wherein the esterification agent comprises an alcohol.

2. The process of claim 1 wherein the gel composition comprises silica.

3. The process of claim 1 wherein the gel composition produced is hydrophobic.

4. The process of claim 1 wherein the catalyst comprises an amine.

5. A process for producing a gel composition comprising: esterifying a significant portion of the surface of a gel composition sufficient to produce a gel composition having a rod density of less than or equal to 0.15 g/cc through contact with at least one esterification agent in the presence of at least one catalyst at a temperature of less than or equal to the atmospheric boiling point of the esterification agent, wherein the esterification agent comprises an alcohol.

6. The process of claim 5 wherein the gel composition is hydrophobic.

7. The process of claim 5 wherein the catalyst comprises an amine.

8. The process of claim 5 wherein the gel composition comprises silica.

9. The process of claim 8 wherein the gel composition further comprises carbon black.

10. The process of claim 2 wherein the gel composition further comprises carbon black.

11. A process for producing a gel composition comprising: esterifying a significant portion of the surface of a gel composition sufficient to produce a gel composition having a tap density of less than or equal to 0.15 g/cc through contact with at least one esterification agent in the presence of at least one catalyst at a pressure of less than or equal to 300 psia, wherein the esterification agent comprises an alcohol.

12. The process of claim 11 wherein the gel composition is hydrophobic.

13. The process of claim 11 wherein the catalyst comprises an amine.

14. The process of claim 11 wherein the gel composition comprises silica.

15. A process for producing a gel composition comprising: esterifying a significant portion of the surface of a gel composition sufficient to produce a gel composition having a tap density of less than or equal to 0.15 g/cc through contact with at least one esterification agent in the presence of at least one catalyst at a temperature of less than or equal to the atmospheric boiling point of the esterification agent, wherein the esterification agent comprises an alcohol.

16. The process of claim 15 wherein the gel composition is hydrophobic. comprises silica.

17. The process of claim 15 wherein the catalyst comprises an amine.

18. The process of claim 15 wherein the gel composition comprises silica.

19. The process of claim 14 wherein the gel composition further comprises carbon black.

20. The process of claim 18 wherein the gel composition further comprises carbon black.

* * * * *